United States Patent [19]

Frame

[11] Patent Number: 5,544,344
[45] Date of Patent: Aug. 6, 1996

[54] APPARATUS FOR CACHING SMRAM IN AN INTEL PROCESSOR BASED COMPUTER SYSTEM EMPLOYING SYSTEM MANAGEMENT MODE

[75] Inventor: Robert C. Frame, Westboro, Mass.

[73] Assignee: Digital Equipment Corporation, Maynard, Mass.

[21] Appl. No.: 349,853

[22] Filed: Dec. 6, 1994

[51] Int. Cl.$^6$ .................................................. G06F 13/14
[52] U.S. Cl. ........................ 395/471; 395/472; 395/483
[58] Field of Search .................................. 395/452, 453, 395/468, 471, 472, 490, 483

[56] References Cited

U.S. PATENT DOCUMENTS 4,484,267  11/1984  Fletcher .................................. 395/471
4,885,680  12/1989  Anthony et al. ........................ 395/471

OTHER PUBLICATIONS

Handy, Jim; *The Cache Memory Book;* Academic Press, Inc., 1993; p. 86.
IntelDX4™ *Processor Date Book,* (#241944-001), Intel Corp., Feb. 1994; pp. 5–11 through 5–13.

*Primary Examiner*—David L. Robertson
*Attorney, Agent, or Firm*—Mary M. Steubing; Ronald C. Hudgens

[57] ABSTRACT

An apparatus and method for caching SMRAM in an Intel® CPU employing system management mode. A cache for the CPU includes a plurality of data entries and an SMRAM status bit corresponding to each data entry. The SMRAM status bit is set if the data entry holds data in SMRAM, and reset if the data entry does not hold data in SMRAM. The SMRAM status bit distinguishes SMRAM data from system memory data in the cache, thereby eliminating cache coherency problems.

18 Claims, 4 Drawing Sheets

APPARATUS FOR CACHING SMRAM IN AN INTEL PROCESSOR BASED COMPUTER SYSTEM EMPLOYING SYSTEM MANAGEMENT MODE

BACKGROUND OF THE INVENTION

The invention relates to Intel processor based personal computer hardware implementations, and particularly to SMRAM support for Intel processors employing System Management Mode.

Computer systems employing the SL Enhanced Intel486™ microprocessor (and follow-ons) can take advantage of an operating mode unique to that architecture and known as "System Management Mode" (SMM). SMM can be used by the system firmware to control product-specific hardware features in a manner which is transparent to the Operating System and applications software. SMM may be used, for example, for system management information such as the system configuration or the configuration of a powered-down device, or to invoke a power-saving routine such as a zero-volt suspend function.

SMM is, however, subject to certain inefficiencies in DOS™ compatible personal computer systems. When operating in SMM, the Intel microprocessor accesses a dedicated memory known as SMRAM. SMRAM can be implemented in one of two ways. First of all, SMRAM can occupy an area of memory having a uniquely addressable location—known as "non-overlayed" memory. In such an arrangement, SMRAM is fully cacheable in the processor's internal cache. However, in DOS compatible systems, the first megabyte of memory space is mapped according to software compatibility requirements, forcing SMRAM to be located beyond the first megabyte of addressable memory space. But operating from memory spaces beyond the first megabyte has certain restrictions associated with it according to the processor architecture—in particular, far jumps are restricted and code size is constrained to 64K segments.

Therefore a second SMRAM implementation is more typically used in personal computer system designs. Accordingly, SMRAM is addressed such that it overlays some other area of system memory in the first megabyte—that is, it is addressed at the same location as the other area. When the processor is in normal mode, accesses to that location of system memory are treated normally. When in SMM, accesses to that location are redirected to SMRAM. The processor is unaware of the remapping.

Because the processor is unaware of the remapping, its internal cache cannot differentiate between the two physically separate memories. Cache coherency is thus compromised. This problem is currently approached in either of two ways: by making SMRAM non-cacheable, or by doing cache invalidate cycles upon entry and exit from SMM. Both of these schemes negatively impact performance by making ineffective use of the cache.

As SMM applications expand they continue to demand greater proportions of processor time. Thus, there is an increasing need for a more efficient SMRAM implementation.

SUMMARY OF THE INVENTION

In accordance with the present invention, there is provided apparatus and a method for caching SMRAM in an Intel CPU employing system management mode. Accordingly, a cache for the CPU includes a plurality of data entries and an SMRAM status bit corresponding to each data entry. The SMRAM status bit is set if the data entry holds data in SMRAM, and reset if the data entry does not hold data in SMRAM.

Thus, even though a cache tag can be associated with either SMRAM or system memory in a computer system employing overlayed SMRAM, the SMRAM status bit serves to distinguish SMRAM data from system memory data in the cache, thereby eliminating prior art cache coherency problems.

A CPU operating according to the principles of the invention employs System Management Mode (SMM), and is capable of initiating transactions between the CPU and an SMRAM when the CPU is in SMM. The CPU includes a cache having cache entries, each cache entry having associated with it a cache tag entry, a cache data entry, and an SMRAM status bit. For loading cache entries, the CPU includes means for determining whether an address associated with a given transaction is within a range of addresses defining the addressable location of SMRAM. Further provided is means for indicating whether the CPU is in SMM. Also provided are means for writing the data associated with the transaction into a cache data entry and means for setting the SMRAM status bit corresponding to the cache data entry if the CPU is in SMM and the address is within the range of addresses. The SMRAM status bit is reset if the CPU is not in SMM.

The means for determining whether an address associated with a given transaction is within a range of addresses defining the addressable location of SMRAM can be provided through the use of an SMRAM_START register storing the least significant address at which the CPU can access the SMRAM, and either an SMRAM_SIZE register for storing the size in bytes of the SMRAM or an SMRAM_END register for storing the most significant address at which the CPU can access the SMRAM.

According to a more specific aspect of the invention, the CPU can further include means for enabling the setting of the SMRAM status bit. The means for enabling can be provided by an SMRAM_CACHE_ENABLE register bit which when set enables the setting of the SMRAM status bit and when reset disables the setting of the SMRAM status bit.

For determining cache hits and reading cache entries, the CPU further includes means for comparing a portion of an address associated with a given transaction to a cache tag entry within one of the cache entries. A tag_match signal is asserted in response to this comparison when the portion of the address matches the cache tag entry. Also provided is means for comparing the SMRAM status bit associated with the cache entry to the means for indicating whether the CPU is in SMM and to the means for determining whether an address associated with a given transaction is within a range of addresses defining the addressable location of SMRAM. A status_bit_match signal is asserted in response when the SMRAM status bit is asserted and the CPU is in SMM and the address is within the addressable location of SMRAM or when the SMRAM status bit is deasserted and the CPU is in SMM and the address is outisde the addressable location of SMRAM or when the SMRAM status bit is deasserted and the CPU is not in SMM. Also provided is means for indicating a cache hit when the tag_match signal is asserted and the status_bit_match signal is asserted.

DETAILED DESCRIPTION OF THE PREFERRED EMBODIMENT

Figure 1:
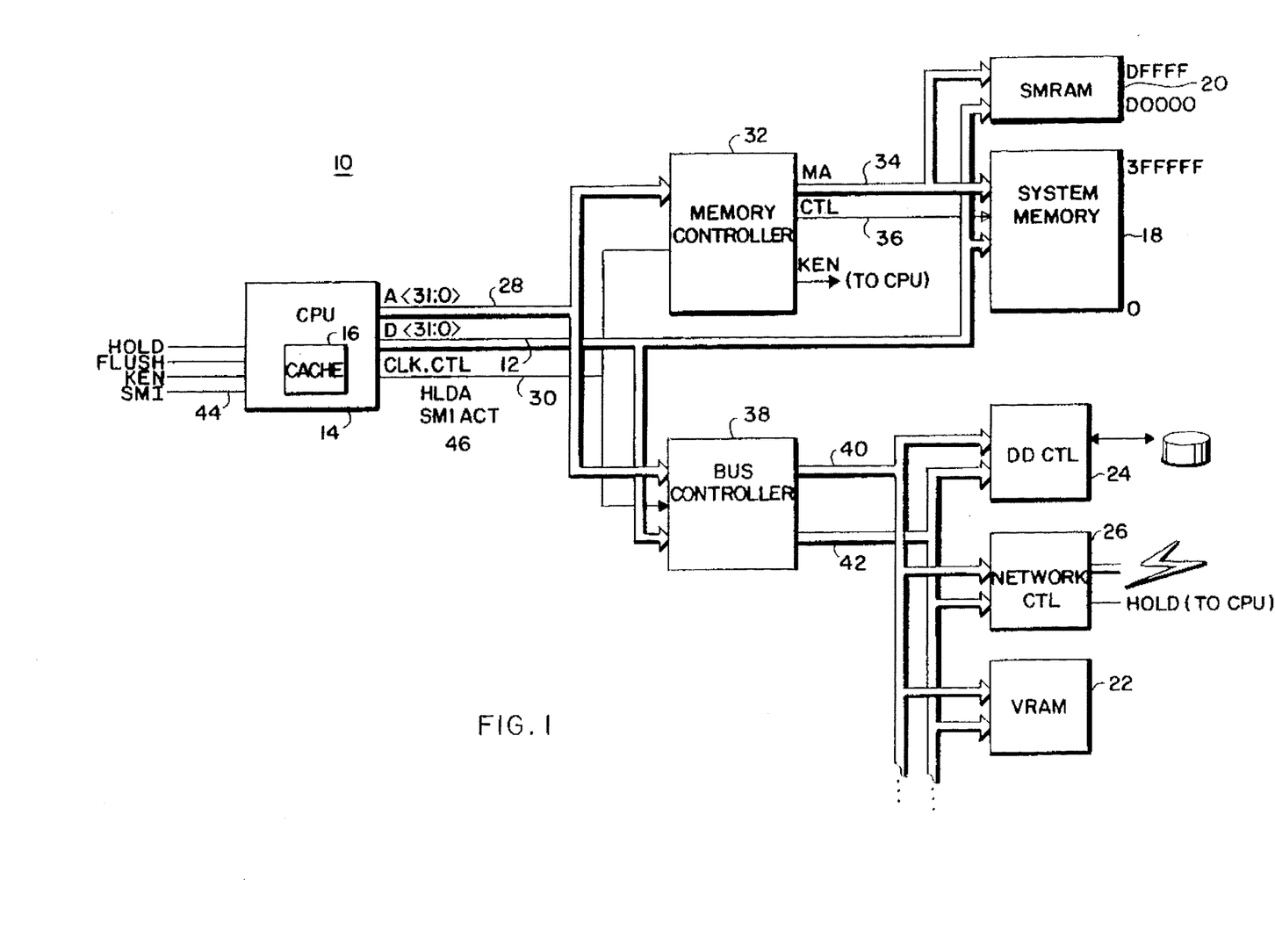
FIG. 1 is a block diagram of a computer system wherein SMRAM is employed according to the principles of the invention.

Referring now to FIG. 1 there is shown a logical block diagram of a personal computer system 10 embodying the principles of the invention. Within the computer system 10 bus transactions are performed via a system data bus 12 between a CPU 14 containing an internal cache 16 and a system memory 18, SMRAM 20, a video memory 22, and various I/O peripheral devices such as a disk drive controller 24 and a network controller 26. The CPU 14 is coupled via a system address bus 28 and CPU control signals 30 to a memory controller 32, which is in turn coupled to the system memory 18 and SMRAM 20. The memory controller 32 provides memory address lines 34 and memory control signals 36 to the system memory 18 and SMRAM 20 to enable data transfers between the system memory 18 or SMRAM 20 and the CPU 14 via the system data bus 12. The CPU 14 is also coupled via the system address bus 28, system data bus 12, and CPU control signals 30 to a bus controller 38, which is in turn coupled via a buffered address bus 40 and buffered data bus 42 to the video memory 22, network controller 26, and disk drive controller 24, and any other peripheral devices. The computer system 10 of FIG. 1 may be embodied for example as a desktop computer, a notebook computer, or a server, and may or may not include all of the devices shown in FIG. 1.

In the preferred embodiment shown the CPU 14 is an SL Enhanced Intel486 Microprocessor from Intel Corporation—though it is understood that the invention can be advantageously implemented in any computer system employing any of the SL Enhanced CPU family of Intel microprocessors. This family of Intel microprocessors employs Intel's System Management Mode (SMM)—a unique Intel architecture operating mode employing a dedicated interrupt line SMI (line 44 of FIG. 1) and memory space SMRAM 20. SMM is used to implement intelligent power management and other enhanced system functions in firmware in a manner which is completely transparent to the operating system and applications software.

SMM is invoked by generating a System Management Interrupt via assertion of the SMI signal 44 to the CPU 14. The CPU 14, in response, asserts the SMIACT control signal 46, and then accesses SMRAM 20—a memory space dedicated and secured for use in SMM only—i.e. the operating system and applications software do not have access to this space. The current CPU 14 state (context) is stored in SMRAM 20 after assertion of the SMIACT signal, and the CPU 14 then jumps to a location in SMRAM 20 to execute the SMI handler code for performing the system management activities. Upon completion of the system management activities, the SMI handler executes a resume (RSM) instruction which restores the CPU 14's context from SMRAM 20, de-asserts the SMIACT signal, and then returns control to the previously interrupted OS or application program execution.

Addresses asserted by the CPU 14 on the address bus 48 are herein referred to as "system" addresses, and are referred to in hexadecimal format, denoted by the suffix 'H'. The Intel microprocessor's address bus 48 is 32 bits wide and is thus capable of addressing a four gigabyte system address space. The SMRAM 20 may be located anywhere within this system address space. However, according to the Intel microprocessor architecture, program code residing in the lower 1 megabyte (Mbyte) of the system address space—that is, from 0H to FFFFFH—has greater flexibility than code residing above the first Mbyte—that is, from 100000H and beyond. Code residing above the first Mbyte is restricted in size to 64 Kbyte segments, and is restricted from using far "jump" instructions to access code outside of the segment in which it resides. This restriction is particularly odious to routines which require calls to the system BIOS code, which resides in the lower Mbyte. Thus, when executing system management code via SMM which requires BIOS calls, it is desirable to execute the code from the lower Mbyte of the system address space.

Figure 2:
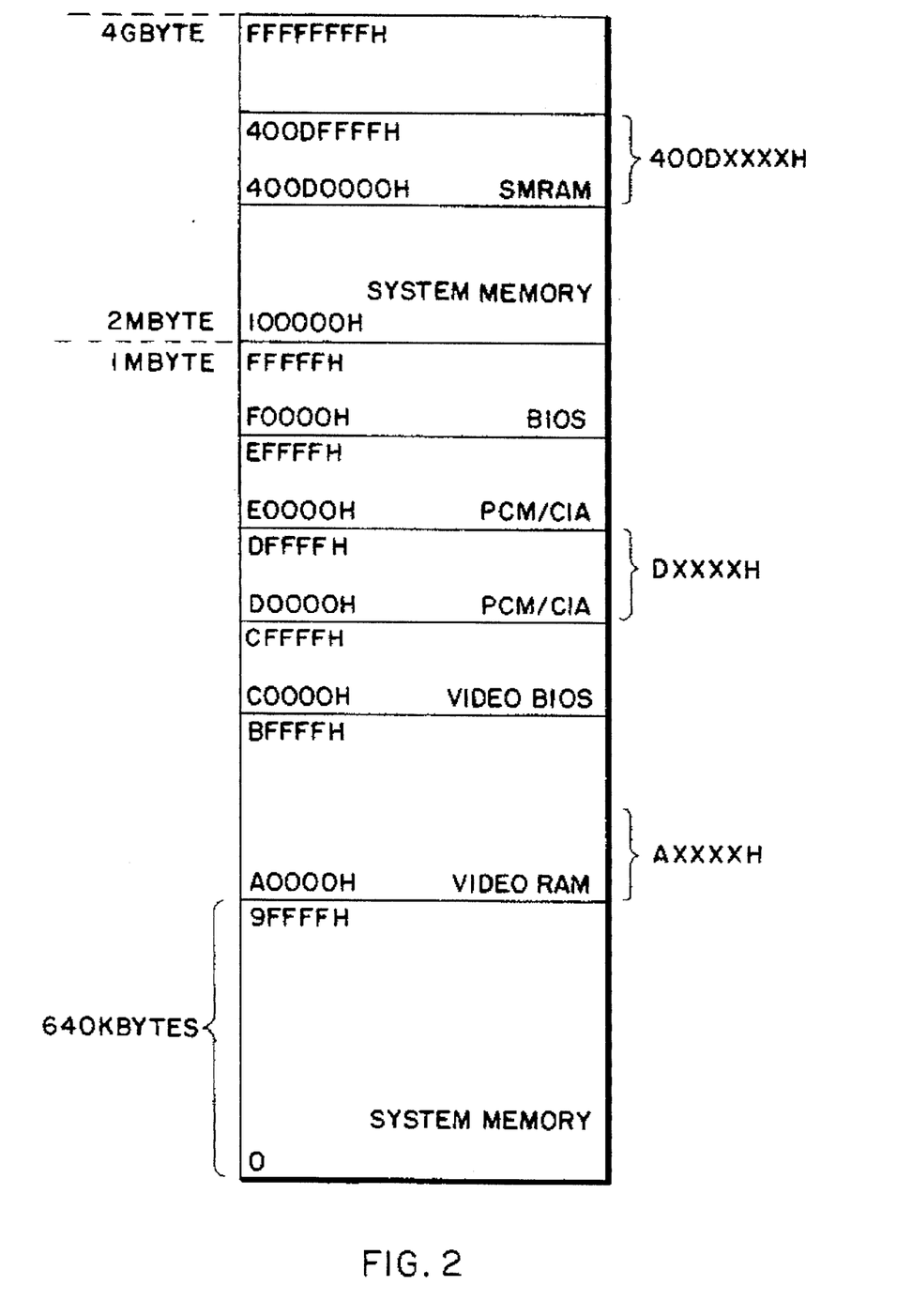
FIG. 2 is a representative system address map for the computer system shown in FIG. 1.

Referring now to FIG. 2, there is shown one possible partial system address mapping for the computer system 10 of FIG. 1, which is typical of available MS-DOS compatible personal computer systems. The lowest 640 Kbytes of system address, that is system addresses 0H-9FFFFH, map to system memory 18. System addresses A0000H-BFFFFH map to video memory 22. System addresses C0000H-CFFFFH map to video BIOS code. System addresses D0000H-DFFFFH and E0000H-EFFFFH are often mapped to separate PCMCIA peripheral areas respectively, or may be mapped to other types of peripheral devices. System addresses F0000H-FFFFFH are reserved for BIOS code. System addresses 100000H (1 Mbyte) and beyond are mapped to system memory for applications use.

As can be seen in the address mapping of FIG. 2, the lower Mbyte of system address space (from 0H through FFFFFH) in a typical personal computer system is already fully mapped for software compatibility. Thus, in order to execute system management code from the low Mbyte of system address space, SMRAM 20 must be "overlayed" with regular system memory 18. That is, both SMRAM 20 and system memory 18 are addressed at a single range of system address locations, so the physical memory being addressed at a given time is dependent upon whether the CPU is in SMM. For example, SMRAM 20 can be mapped to reside at system address locations D0000H-DFFFFH. When in normal operating mode, an access to system address D0000H by the processor is directed via the decoder to the memory address D0000H in system memory. But when in SMM, an access to system address D0000H by the processor is directed via the decoder to SMRAM, wherever SMRAM is physically located. The memory controller 32 monitors the address bus 48 and the state of the SMI_ACT signal 46 in order to properly direct CPU 14 accesses to system address locations D0000H-DFFFFH.

The previously described overlayed SMRAM implementation has in the past been subject to cache coherency problems, as the CPU's internal cache 16 cannot distinguish an SMRAM 20 access from a system memory 18 access for a given system address. The prior art solution to the cache coherency problem is to render SMRAM 20 non-cacheable; therefore, SMM code executing from overlayed SMRAM 20 has been subject to performance degradation. According to the principles of the invention, however, there is provided a modification to the Intel CPU 14 architecture which permits caching of overlayed SMRAM 20.

Figure 3:
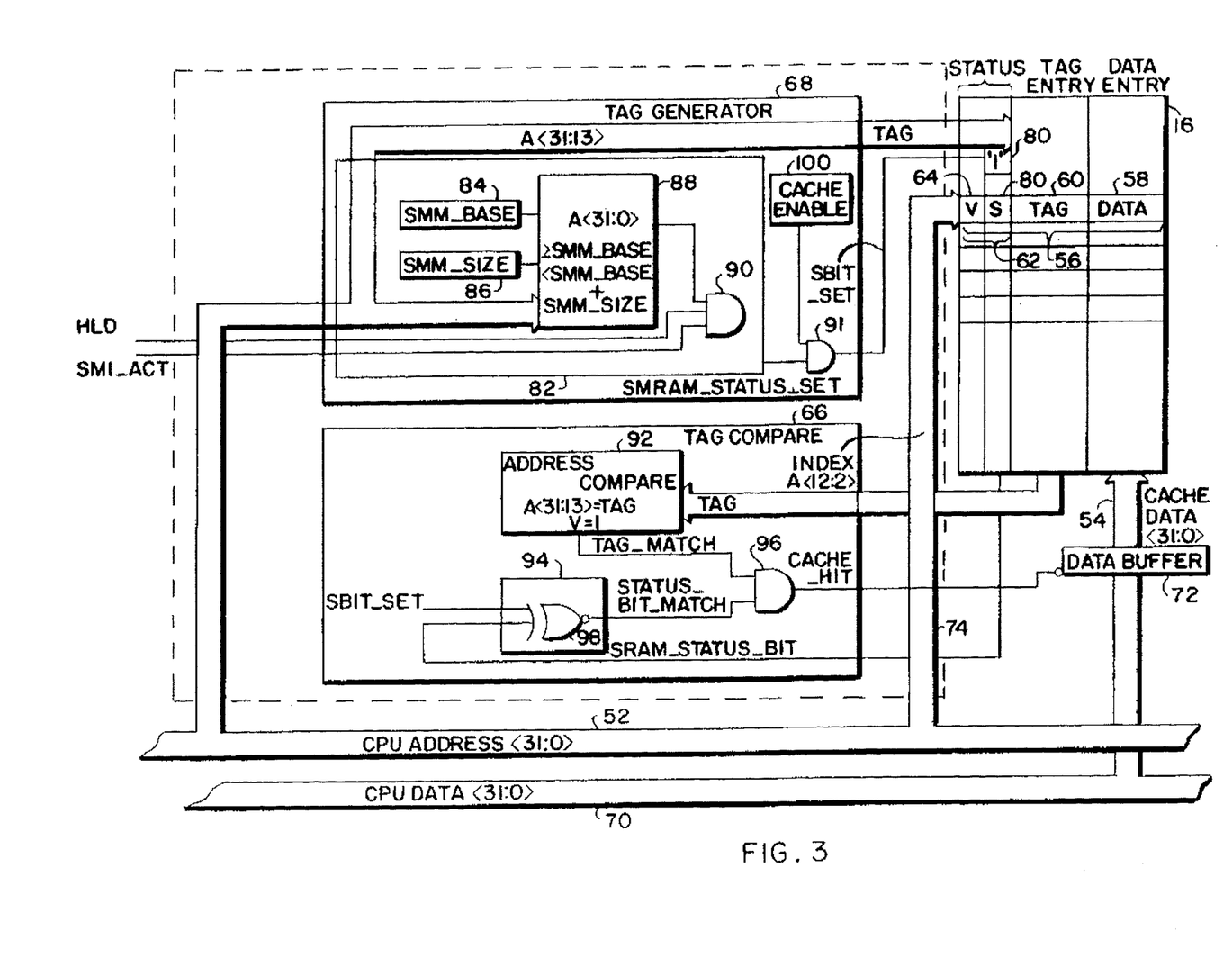
FIG. 3 is a block diagram of the cache and related logic internal to the CPU of FIG. 1 according to the principles of the invention.

Referring now to FIG. 3, there is shown a logical block diagram of a portion of the CPU 14. The CPU 14's internal cache 16 is coupled to a cache controller 50 which is in turn coupled to a CPU address bus 52 and a cache data bus 54. The cache 16 includes individual cache entries 56. Each cache entry 56 includes at least a data entry 58 for storage of cached system memory or SMRAM data, a tag entry 60 which is associated with the system address of the data stored in the data entry 58, and certain status bits 62 including a valid bit 64 which indicates that the corresponding data entry 58 contains valid data. For purposes of example the cache 16 is shown to be an 8 Kbyte direct-mapped write-through cache.

Within the cache controller 50 the tag entries 60 and valid bits 64 are coupled to a tag compare circuit 66 and to a tag generator circuit 68. The cache data bus 54 is coupled to the CPU data bus 70 via a bi-directional data buffer 72, which is controlled by the tag compare circuit 66. The CPU address bus 52 is coupled to the system address bus 28, which in turn is coupled to the memory controller 32. The CPU data bus 70 is likewise coupled to the system data bus 12, which in turn is coupled to the system memory 18.

The cache 16 operates to cache system memory 18 data generally as follows. The CPU 14 initiates a memory transaction, which in this example is a memory read transaction, by asserting the address targeting the transaction on the CPU address bus 52. As the address is asserted on the address bus 48, some of the address bits are used internal to the CPU 14 as an index 74 into the cache 16—that is, these address bits are used to select a particular cache entry 56. Next, the tag entry 60 at the indexed location is read by the tag compare circuit 66. The tag entry 60 is compared to the rest of the address bits asserted on the address bus 48, and status bits, including the valid bit 64, are checked. If the tag entry 60 matches these address bits, and the valid bit 64 indicates a valid cache entry 56, a "cache hit" occurs. The tag compare circuit 66 directs the data buffer 72 such that the requested data is read from the corresponding data entry 58 onto the CPU data bus 70, thus avoiding the need to initiate an external system bus transaction on the system address bus 28 and system data bus 12. Cache hits can provide the CPU 14 with requested data in only one CPU clock cycle; therefore, repeated cache hits greatly enhance computer system 10 performance.

In the event that the tag compare circuit 66 determines that the tag entry 60 at the indexed location does not match the currently asserted CPU address bus 52 bits being compared, or that the valid bit 64 is deasserted, a "cache miss" occurs. A system bus transaction is initiated on the system address bus 28 in response to the cache miss in order to access the addressed location in system memory 18. Data is then read from system memory 18 via the system data bus 12, and the tag compare circuit 66 directs data from the CPU data bus 70 to the cache data bus 54 via the data buffer 72, and the data is written into the indexed cache entry 56.

For the 8K direct-mapped cache of the present example, each cache data entry 58 holds 32 bits of data, and the address bus 48 bits A<12:2> are used as the index 74 into the cache 16. The tag entry 60 at the indexed location is read and compared to the most significant address bus 48 bits A<31:13>. If the tag entry 60 matches the corresponding address bus 48 bits A<31:13> presently asserted, and other status bits are in particular states—for instance, the valid bit 64 indicates that the cache entry 56 is valid—a "cache hit" occurs. In the event that the tag compare circuit 66 determines that the tag entry 60 at the indexed location does not match the currently asserted CPU address bus 52 bits A<31:13>, or that other status bits are in a particular state—for instance, the valid bit 64 is deasserted—then a "cache miss" occurs.

Of course, cache hits and misses also occur for memory write transactions. For the write-through cache of the present example, a cache entry 56 is written into the cache 16 on either a cache hit or a cache miss. The data written into the corresponding data entry 58 is simultaneously written to the presently addresses location in system memory (or SMRAM) via the system data bus 12.

It is understood that the previously described cache is one of many possible embodiments. The sizes of cache data entries 58 and tag entries 60 and the number and selection of address bits used to index the cache 16 depend upon the total size of the cache implemented and upon other CPU 14 performance considerations. Furthermore, other status bits are often implemented in addition to the valid bit 64. The broad principles of the invention are intended to encompass any of the many different specific implementations.

According to the principles of the invention, cache entries 56 storing overlayed SMRAM data can be distinguished by the CPU from cache entries 56 storing system memory data. Accordingly, each cache tag entry 60 has associated with it an SMRAM status bit 80, which when set indicates that the corresponding data entry 58 holds SMRAM data. Thus, even though the tag entry 60 associated with data in the overlayed address space is identical for both SMRAM data and system memory data located at the same physical system address, the SMRAM status bit 80 allows the CPU 14 to distinguish overlayed SMRAM data from system memory 18 data, thereby rendering overlayed SMRAM fully cacheable and concomitantly increasing performance for SMM code.

Means is first provided for setting or resetting the SMRAM status bit 80 when writing the cache entries 56. The tag generator circuit 68 includes an SMRAM status bit generation circuit 82 which sets the SMRAM status bit 80 when the CPU 14 is loading data from SMRAM 20 into the cache 16. To do so, the SMRAM status bit generation circuit 82 accepts as input the SMI_ACT signal, which when asserted indicates that the CPU 14 is in SMM. The SMRAM status bit generation circuit 82 further includes means for determining whether an address associated with a given bus transaction is within a range of addresses defining the addressable location of SMRAM 20 within the CPU 14's addressable space. Two writable registers: an SMRAM base register 84 and an SMRAM size register 86: provide such means. The SMRAM base register 84 stores the system address of the start of the SMRAM address space. The SMRAM size register 86 stores the number of bytes of SMRAM available. For example, if 8 Kbytes of system memory has been allocated as SMRAM starting at an address of D0000H, the SMRAM base register 84 contains the value D0000H and the SMRAM size register 86 contains the value 2000H.

In order to determine whether an address associated with a present transaction addresses SMRAM, an address comparator 88 within the SMRAM status bit generation circuit 82 checks the address asserted on the CPU address bus 52 to see whether it falls within the range of addresses defined by the SMRAM base register 84 and the SMRAM size register 86. This range of addresses is conveniently referred to as the "SMMWINDOW". Thus, if the presently asserted address is greater than or equal to the contents of the SMRAMbase register 84 and less than the sum of the contents of the SMRAM base register 84 plus the SMRAM size register 86, the address falls within the SMMWINDOW. If the presently asserted address falls within the SMMWINDOW, and if SMI_ACT is asserted, indicating that the CPU 14 is in SMM, and there is no external bus master, i.e. the HLDA signal is deasserted, the SMRAM_STATUS_SET output is asserted via the 'AND' gate 90. Thus, assuming SMRAM caching is enabled (to be further described), as the data entry 58 and tag entry 60 are written for the cache entry 56 associated with the present transaction, the asserted SMRAM_STATUS_SET output is passed by an AND gate 91, asserting an SBIT_SET signal and thereby setting the SMRAM status bit 80 associated with the cache entry 56.

On the other hand, for accesses to the range of addresses defined by the SMMWINDOW that occur when the CPU 14 is not in SMM, SMI_ACT is not asserted at the AND gate 90 and therefore the SMRAM_STATUS_SET output is deasserted and the SMRAM status bit 80 associated with the cache entry 56 is not set. Therefore, access to SMRAM 20 and to system memory 18, though occurring at the same physical address location, are distinguished in the cache 16 by the state of the SMRAM status bit 80.

For example, according to the presently described embodiment, if the SMRAM base register 84 contains the value D0000H and the SMRAM size register 86 contains the value 2000H then the SMMWINDOW ranges from D0000H to D2000H. If an address of D01A0H is asserted on the CPU address bus 52, the address comparator 88 determines that the address falls within SMMWINDOW. Then, if SMI_ACT is asserted, indicating that the CPU is in SMM, the SMRAM_STATUS_SET output signal is asserted via the 'AND' gate 90 and the SMRAM status bit 80 associated with the indexed cache entry 56 is set (i.e. written to binary '1'). Else, if SMI_ACT is deasserted, indicating that the CPU is not in SMM, the SMRAM_STATUS_SET output is deasserted via the 'AND' gate 90 and the SMRAM status bit 80 associated with the presently indexed cache entry 56 is reset (i.e. written to binary '0').

Means is further provided for distinguishing cache entries 56 including SMRAM 20 data from cache entries 56 including system memory 18 data when reading from the cache 16, to determine whether a cache hit has occurred. Accordingly, the tag compare circuit 66 includes an address compare circuit 92 and an SMRAM check circuit 94. The address compare circuit 92 checks the presently indexed tag entry 60 bits and compares them to the portion of the CPU address bus 52 address bits that are used for generating the tag entries 60. For purposes of the present example, the tag entry 60 bits are compared to the most significant CPU address bus 52 bits A<31:13>. The address compare circuit 92 also checks the valid bit 64. If the address bits A<31:13> match the tag entry 60, and the valid bit 64 is asserted, the output signal TAG_MATCH from the address compare circuit 92 is asserted.

Meanwhile, within the SMRAM check circuit 94, the SMRAM status bit 80 associated with the presently indexed cache entry 56 is compared with the SMI_ACT signal and the SMMWINDOW. If the presently indexed cache entry 56 holds SMRAM data, and SMI_ACT is asserted, indicating that the CPU 14 is in SMM, the output "STATUS_BIT_MATCH" of the SMRAM check circuit 94 is asserted. Also, if the presently indexed cache entry 56 does not hold SMRAM data, and SMI_ACT is asserted, indicating that the CPU 14 is in SMM, and the presently asserted address does not fall within SMMWINDOW, the output "STATUS_BIT_MATCH" of the SMRAM check circuit 94 is asserted. Finally, if the presently indexed cache entry 56 contains system memory 18 data, and SMI_ACT is deasserted, indicating that the CPU 14 is not in SMM, the output signal "STATUS_BIT_MATCH" from the SMRAM check circuit 94 is asserted. "STATUS_BIT_MATCH" is 'anded' via AND gate 96 with the output "TAG_MATCH" from the address compare circuit 92 to produce the signal "tag hit", which when asserted indicates that a cache hit has occurred.

The SMRAM check circuit 94 is here shown embodied as an XNOR gate 98. The XNOR gate 98 accepts as input the SMRAM status bit 80 for the presently indexed cache entry 56, and the SBIT_SET signal output from the AND gate 102. The SBIT_SET signal is asserted if the present address falls within SMMWINDOW and the SMI_ACT signal is asserted (and the HLDA signal is deasserted). Thus, if the SMI_ACT signal is asserted and the present address falls within SMMWINDOW so that the SBIT_SET signal is asserted, and the SMRAM status bit 80 is asserted, the output "STATUS_BIT_MATCH" of the XNOR gate is asserted. Also, if the SMI_ACT signal is asserted and the present address does not fall within SMMWINDOW so that the SBIT_SET signal is deasserted, and the SMRAM status bit 80 is also deasserted, the output "STATUS_BIT_MATCH" of the XNOR gate is asserted. However, if the SBIT_SET signal is asserted but the SMRAM status bit 80 is not asserted, the presently indexed tag does not hold requested SMRAM data, and thus the output "STATUS_BIT_MATCH" of the XNOR gate 98 is deasserted. Likewise, if the SMRAM status bit 80 is asserted but the SBIT_SET signal is deasserted, the CPU 14 is accessing overlayed system memory at a location in which SMRAM is presently cached; thus, the output "STATUS_BIT_MATCH" of the XNOR gate 98 is deasserted.

Accordingly, when the CPU 14 is in SMM, and the address compare circuit 92 signals a tag match between a portion of the CPU address bus 52 and the presently indexed cache tag entry 60, and the SMRAM status bit 80 indicates that the presently indexed cache data entry 58 holds SMRAM data, the TAG_HIT and STATUS_BIT_MATCH signals are asserted and a cache hit occurs. Also, when the CPU 14 is in SMM, and the presently asserted address falls outside the SMMWINDOW, and the address compare circuit 92 signals a tag match, and the SMRAM status bit 80 indicates that the presently indexed cache data entry 58 holds system memory 18 data, the TAG_HIT and STATUS_BIT_MATCH signals are asserted and a cache hit occurs. And, when the CPU 14 is in not in SMM, and the address compare circuit 92 signals a tag match, and the SMRAM status bit 80 indicates that the presently indexed cache data entry 58 holds system memory 18 data, the TAG_HIT and STATUS_BIT_MATCH signals are asserted and a cache hit occurs. However, when the CPU is in SMM, and the presently asserted address falls within the SMMWINDOW, and the address compare circuit 92 signals a tag match, and the SMRAM status bit 80 is deasserted, indicating that the presently indexed cache data entry 58 holds system memory 18 data, the STATUS_BIT_MATCH signal is deasserted and a cache miss occurs. Likewise, if the CPU 14 is not in SMM, and the address compare circuit 92 signals a tag match, and the SMRAM status bit 80 is asserted, indicating that the presently indexed cache entry 56 holds SMRAM data, the STATUS_BIT_MATCH signal is deasserted and a cache miss occurs. The SMRAM status bit 80 thus serves to distinguish system addresses targeting SMRAM 20 from system addresses targeting system memory 18 when writing to and reading from the cache 16, so that cache coherency problems formerly associated with overlayed SMRAM 20 are eliminated.

In order to provide backward compatibility with computer systems which do not expect SMRAM 20 to be cached, there is provided means for enabling caching of SMRAM 20. A writable SMRAM_cache_enable register bit 100 is provided within the SMRAM status bit generation circuit 82, which when set indicates that caching of SMRAM 20 is enabled, and when reset indicates that caching of SMRAM 20 is disabled. The SMRAM_cache_enable register bit 100 is 'anded' with the output of the SMRAM status bit generation circuit 82 via the AND gate 91. Thus, when the SMRAM_cache_enable register bit 100 is reset, the SMRAM status bit 80 for a given cache entry 56 will be deasserted. The SMRAM_cache_enable register bit is reset by default, such that the CPU 14 is backward compatible with CPUs not implementing SMRAM caching according to the principles of the invention.

When the SMRAM_cache_enable register bit 100 is reset, thereby disabling the CPU 14's ability to distinguish between system memory 18 and overlayed SMRAM 20, the system implementation must be careful to follow the recommended procedures to ensure that SMRAM 20 is not cached in order to ensure cache coherency between SMRAM 20 and system memory 18. That is, the cache 16 must be flushed upon entrance to and exit from SMM, or caching of individual accesses to SMRAM 20 must be disabled.

Figure 4:
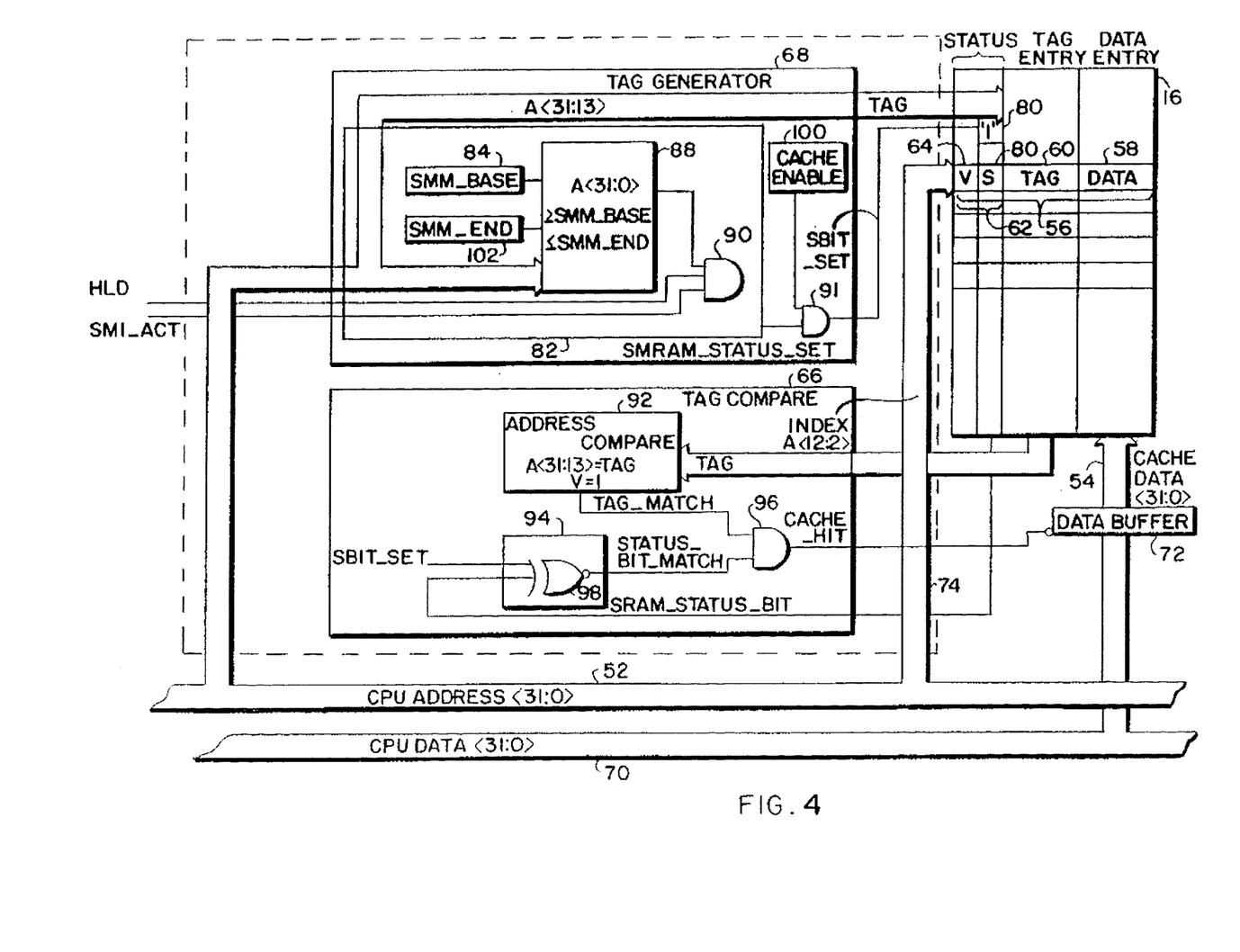
FIG. 4 is a block diagram of an alternative implementation of the cache logic of FIG. 3.

As shown in FIG. 4, one alternative to the implementation of the address comparator 88 previously described is to provide an SMRAM end register 102 rather than an SMRAM size register 86. Then the address comparator 88 can check the address presently asserted on the CPU address bus 52 to ensure it is greater than or equal to the value contained in the SMRAM base register 84 but less than or equal to the value in the SMRAM end register 102. In addition, it should be noted that the microprocessor already provides an SMRAM base register 84 for defining the base location of SMRAM within the system address map. Therefore only the SMRAM size register 86 or the SMRAM end register 102 need be added to the microprocessor architecture.

It is apparent that, within the scope of the invention, modifications and different arrangements may be made other than as herein disclosed. The present disclosure is merely illustrative, the invention comprehending all variations thereof.

What is claimed is:

1. A CPU employing System Management Mode (SMM), the CPU being capable of initiating transactions between the CPU and an SMRAM when the CPU is in SMM, a transaction having an address and data associated with it, the CPU comprising:

a cache having cache entries, each cache entry having associated with it a cache tag entry, a cache data entry, and an SMRAM status bit;

means for determining whether an address associated with a given transaction is within a range of addresses defining the addressable location of SMRAM;

means for indicating whether the CPU is in SMM;

means for writing the data associated with the transaction into a cache data entry, and means responsive to the means for determining and to the means for indicating for setting the SMRAM status bit corresponding to the cache data entry if the CPU is in SMM and the address is within the range of addresses.

2. The CPU of claim 1 further comprising means for resetting the SMRAM status bit corresponding to the cache data entry if the CPU is in not in SMM.

3. The CPU of claim 1 wherein said means for determining whether an address associated with a given transaction is within a range of addresses defining the addressable location of SMRAM comprises:

an SMRAM_START register storing the least significant address at which the CPU access the SMRAM;

an SMRAM_SIZE register storing the size in bytes of the SMRAM; and means for determining whether said address is greater than or equal to the contents of SMRAM_START but less than the total of the contents of SMRAM_START plus the contents of SMRAM_SIZE.

4. The CPU of claim 1 wherein said means for determining whether an address associated with a given transaction is within a range of addresses defining the addressable location of SMRAM comprises:

an SMRAM_START register storing the least significant address at which the CPU can access the SMRAM;

an SMRAM_END register storing the most significant address at which the CPU can access the SMRAM; and means for determining whether said address is greater than or equal to the contents of SMRAM_START but less or equal to the contents of SMRAM_END.

5. The CPU of claim 1 further comprising means for disabling the setting of the SMRAM status bit.

6. The CPU of claim 5 wherein the means for disabling further comprises:

an SMRAM_CACHE_ENABLE register providing an SMRAM cache enable bit which when set enables the setting of the SMRAM status bit and when reset disables the setting of the SMRAM status bit;

and wherein the means for setting the SMRAM status bit is further responsive to the SMRAM cache enable bit such that the SMRAM status bit corresponding to the cache data entry is set if the CPU is in SMM and the address is within the range of addresses and the SMRAM cache enable bit is set.

7. The CPU of claim 1 further comprising:

means for comparing a portion of an address associated with a given transaction to a cache tag entry within one of the cache entries, said means for comparing a portion of an address asserting a tag_match signal in response to said comparison when said portion of an address matches said cache tag entry;

means for comparing the SMRAM status bit associated with said one the cache entries responsive to said means for indicating and to said means for determining whether an address associated with a given transaction is within a range of addresses defining the addressable location of SMRAM, said means for comparing the SMRAM status bit asserting a status_bit_match signal when either the SMRAM status bit is asserted and the CPU is in SMM and said means for determining whether an address associated with a given transaction is within a range of addresses determines that the address associated with the given transaction is within the range of addresses defining the addressable location of SMRAM or the SMRAM status bit is not asserted and the CPU is in SMM and said means for determining whether an address associated with a given transaction is within a range of addresses determines that the address associated with the given transaction is outside the range of addresses defining the addressable location of SMRAM or the SMRAM status bit is deasserted and the CPU is not in SMM;

means for indicating a cache hit when said tag_match signal is asserted and said status_bit_match signal is asserted.

8. A CPU employing System Management Mode (SMM), the CPU being capable of initiating transactions between the CPU and an SMRAM when the CPU is in SMM, or between the CPU and a system memory when the CPU is not in SMM, a transaction having an address and data associated with it, the CPU comprising:

a cache having cache entries, each cache entry having associated with it an SMRAM status bit, a cache tag entry, and a cache data entry;

means for comparing a portion of an address associated with a given transaction to a cache tag entry within one of the cache entries, said means for comparing a portion of an address asserting a tag_match signal when said portion of an address matches said cache tag entry;

means for indicating whether the CPU is in SMM;

means for determining whether an address associated with a given transaction is within a range of addresses defining the addressable location of SMRAM;

means responsive to said means for indicating and to said means for determining for comparing the SMRAM status bit associated with said one the cache entries, said means for comparing the SMRAM status bit asserting a status_bit_match signal when either the SMRAM status bit is asserted and the CPU is in SMM and said means for determining whether an address associated with a given transaction is within a range of addresses determines that the address associated with the given transaction is within the range of addresses defining the addressable location of SMRAM or when the SMRAM status bit is not asserted and the CPU is in SMM and the means for determining determines that address associated with a given transaction is outside the range of addresses defining the addressable location of SMRAM or when the SMRAM status bit is deasserted and the CPU is not in SMM;

means for indicating a cache hit when said tag_match signal is asserted and said status_bit_match signal is asserted.

9. The CPU of claim 8 further comprising means responsive to said means for indicating a cache hit for reading the data entry associated with said one of the cache entries.

10. A method for caching SMRAM in a CPU employing System Management Mode (SMM), the CPU being capable of initiating transactions between the CPU and an SMRAM when the CPU is in SMM, a transaction having an address and data associated with it, the method comprising the steps of:

providing a cache having cache entries, each cache entry having associated with it a cache tag entry, a cache data entry, and an SMRAM status bit;

determining whether an address associated with a given transaction is within a range of addresses defining the addressable location of SMRAM;

indicating whether the CPU is in SMM;

writing the data associated with the transaction into a cache data entry, and setting the SMPAM status bit corresponding to the cache data entry if the CPU is in SMM and the address is within the range of addresses.

11. The method of claim 10 further comprising the step of resetting the SMRAM status bit corresponding to the cache data entry if the CPU is in not in SMM.

12. The method of claim 10 wherein the step of determining whether an address associated with a given transaction is within a range of addresses defining the addressable location of SMRAM comprises the steps of:

storing the least significant address at which the CPU access the SMRAM in an SMRAM_START register;

storing the size in bytes of the SMRAM in an SMRAM_SIZE register;

determining whether said address is greater than or equal to the contents of SMRAM_START but less than the total of the contents of SMRAM_START plus the contents of SMRAM_SIZE.

13. The method of claim 10 wherein the step of determining whether an address associated with a given transaction is within a range of addresses defining the addressable location of SMRAM comprises the steps of:

storing the least significant address at which the CPU can access the SMRAM in an SMRAM_START register;

storing the most significant address at which the CPU can access the SMRAM in an SMRAM_END register;

determining whether said address is greater than or equal to the contents of SMRAM_START but less or equal to the contents of SMRAM_END.

14. The method of claim 10 further comprising the step of disabling the setting of the SMRAM status bit.

15. The CPU of claim 14 wherein the step of disabling further comprises:

providing an SMRAM_CACHE_ENABLE register bit;

setting the SMRAM_CACHE_ENABLE register bit to enable the setting of the SMRAM status bit;

resetting the SMRAM_CACHE_ENABLE register bit to disable the setting of the SMRAM status bit;

and wherein the step of setting the SMRAM status bit sets the SMRAM status bit corresponding to the cache data entry if the CPU is in SMM and the address is within the range of addresses and the SMRAM_CACHE_ENABLE register bit is set.

16. The method of claim 10 further comprising:

comparing a portion of an address associated with a given transaction to a cache tag entry within one of the cache entries, asserting a tag_match signal in response to said comparison when said portion of an address matches said cache tag entry;

comparing the SMRAM status bit associated with said one the cache entries to said indication of whether the CPU is in SMM and to said determination of whether an address associated with a given transaction is within a range of addresses defining the addressable location of SMRAM;

asserting a status_bit_match signal in response to said comparison of said SMRAM status bit when the SMRAM status bit is asserted and the CPU is in SMM and the determination determines that the address associated with the given transaction is within the range of addresses defining the addressable location of SMRAM or when the SMRAM status bit is deasserted and the CPU is in SMM and the determination determines that the address associated with the given transaction is not within the range of addresses defining the addressable location of SMRAM or when the SMRAM status bit is deasserted and the CPU is not in SMM;

indicating a cache hit when said tag_match signal is asserted and said status_bit_match signal is asserted.

17. A method of caching SMRAM in a CPU employing System Management Mode (SMM), the CPU being capable of initiating transactions between the CPU and an SMRAM when the CPU is in SMM, or between the CPU and a system memory when the CPU is not in SMM, a transaction having an address and data associated with it, the method comprising the steps of:

providing a cache having cache entries, each cache entry having associated with it an SMRAM status bit, a cache tag entry, and a cache data entry;

comparing a portion of an address associated with a given transaction to a cache tag entry within one of the cache entries;

asserting a tag_match signal when said portion of an address matches said cache tag entry;

determining whether an address associated with a given transaction is within a range of addresses defining the addressable location of SMRAM;

indicating whether the CPU is in SMM;

comparing the SMRAM status bit associated with said one of the cache entries to said indication of whether the CPU is in SMM and to said determination of whether an address associated with a given transaction is within a range of addresses defining the addressable location of SMRAM;

asserting a status_bit_match signal in response to said comparison of said SMRAM status bit when the SMRAM status bit is asserted and the CPU is in SMM and the determination determines that the address associated with the given transaction is within the range of addresses defining the addressable location of SMRAM or when the SMRAM status bit is deasserted and the CPU is in SMM and the determination determines that the address associated with the given transaction is not within the range of addresses defining the addressable location of SMRAM or when the SMRAM status bit is deasserted and the CPU is not in SMM;

indicating a cache hit when said tag_match signal is asserted and said status_bit_match signal is asserted.

18. The method of claim 17 further comprising the step of reading the data entry associated with said one of the cache entries in response to said indication of a cache hit.

* * * * *